(12) United States Patent
Bert et al.

(10) Patent No.: US 10,013,344 B2
(45) Date of Patent: Jul. 3, 2018

(54) ENHANCED SSD CACHING

(71) Applicant: Avago Technologies General IP (Singapore) Pte.Ltd, Singapore (SG)

(72) Inventors: Luca Bert, Cumming, GA (US); Anant Baderdinni, Lawrenceville, GA (US); Saugata Das Purkayastha, Bangalore (IN); Philip K. Wong, San Jose, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 730 days.

(21) Appl. No.: 14/164,836

(22) Filed: Jan. 27, 2014

(65) Prior Publication Data

US 2015/0199269 A1    Jul. 16, 2015

Related U.S. Application Data

(60) Provisional application No. 61/927,269, filed on Jan. 14, 2014.

(51) Int. Cl.
*G06F 12/00* (2006.01)
*G06F 12/02* (2006.01)
*G06F 12/0862* (2016.01)

(52) U.S. Cl.
CPC ...... *G06F 12/0246* (2013.01); *G06F 12/0862* (2013.01); *G06F 2212/222* (2013.01)

(58) Field of Classification Search
CPC ..... G06F 12/12; G06F 12/121; G06F 12/0246
USPC .......................................................... 711/103
See application file for complete search history.

(56) References Cited

U.S. PATENT DOCUMENTS

| | | | |
|---|---|---|---|
| 7,853,759 B2 | 12/2010 | Sadovsky et al. ............ 711/154 |
| 8,161,245 B2* | 4/2012 | Fields, Jr. ........... G06F 12/0811 |
| | | | 711/137 |
| 8,176,103 B2 | 5/2012 | Seo et al. ...................... 707/822 |
| 8,621,145 B1 | 12/2013 | Kimmel et al. ............... 711/113 |
| 2005/0268046 A1* | 12/2005 | Heil ..................... G06F 12/0862 |
| | | | 711/137 |
| 2007/0220208 A1* | 9/2007 | Nomura .............. G06F 12/0862 |
| | | | 711/137 |
| 2008/0109565 A1* | 5/2008 | Ajanovic .............. G06F 1/3203 |
| | | | 710/8 |
| 2009/0216956 A1* | 8/2009 | Ekanadham ........ G06F 12/0862 |
| | | | 711/137 |
| 2011/0035548 A1 | 2/2011 | Kimmel et al. .............. 711/114 |

(Continued)

*Primary Examiner* — Prasith Thammavong
(74) *Attorney, Agent, or Firm* — Sheridan Ross P.C.

(57) ABSTRACT

An apparatus comprising a memory and a controller. The memory may be configured to (i) implement a cache and (ii) store meta-data. The cache comprises one or more cache windows. Each of the one or more cache windows comprises a plurality of cache-lines configured to store information. Each of the plurality of cache-lines may be associated with meta-data indicating one or more of a dirty state and an invalid state. The controller may be connected to the memory and configured to detect an input/output (I/O) operation directed to a file system. The controller may perform a read-fill based on a hint value when there is a read miss in the cache. The hint value may be based on the application access pattern. The hint value may be passed to a caching layer with a corresponding I/O.

20 Claims, 4 Drawing Sheets

(56) References Cited

U.S. PATENT DOCUMENTS

| | | | |
|---|---|---|---|
| 2011/0145363 A1* | 6/2011 | Ananthanarayanan | G06F 17/30174 709/218 |
| 2011/0145499 A1* | 6/2011 | Ananthanarayanan | G06F 12/0866 711/118 |
| 2012/0166401 A1 | 7/2012 | Li et al. | 707/692 |
| 2012/0191900 A1 | 7/2012 | Kunimatsu et al. | 711/103 |
| 2012/0317337 A1 | 12/2012 | Johar et al. | 711/103 |
| 2013/0031298 A1 | 1/2013 | Tan et al. | 711/103 |
| 2013/0061214 A1 | 3/2013 | Jagatheesan et al. | 711/151 |
| 2013/0179637 A1* | 7/2013 | Blount | G06F 11/1458 711/118 |
| 2013/0262533 A1 | 10/2013 | Mitra et al. | 707/822 |
| 2013/0297894 A1 | 11/2013 | Cohen et al. | 71/154 |
| 2013/0311706 A1 | 11/2013 | Okada et al. | 711/103 |
| 2013/0339617 A1* | 12/2013 | Averbouch | G06F 12/0862 711/133 |
| 2014/0052927 A1* | 2/2014 | McCauley | G06F 12/0862 711/137 |
| 2014/0089602 A1* | 3/2014 | Biswas | G06F 12/0804 711/144 |
| 2014/0149632 A1* | 5/2014 | Kannan | G06F 12/0862 711/3 |
| 2014/0258640 A1* | 9/2014 | Prasky | G06F 12/0862 711/137 |
| 2014/0281232 A1* | 9/2014 | Hagersten | G06F 12/0862 711/119 |
| 2014/0320509 A1* | 10/2014 | Chen | G06T 1/20 345/501 |

\* cited by examiner

ENHANCED SSD CACHING

This application relates to U.S. Provisional Application No. 61/927,269, filed Jan. 14, 2014, which is hereby incorporated by reference in its entirety.

FIELD OF THE INVENTION

The invention relates to data storage generally and, more particularly, to a method and/or apparatus for implementing an enhanced SSD caching system.

BACKGROUND

Conventional flash technology based cache device (e.g. SSD) is commonly used to cache frequently accessed "hot" data so that a host (application) access time for the "hot" data is improved. However, flash technology based devices can sustain only a limited number of writes before the flash storage area becomes unreliable or bad. The time when the cache device can sustain the writes reliably is also called a lifetime. After the cache device exhausts the lifetime, the cache device is either bypassed, thereby impacting performance, or the cache device needs to be physically replaced and rebuilt. To extend the lifetime of the cache device, the number of writes to the cache device is minimized. Conventional approaches for handling a cache miss during read includes a read-fill of a complete cache-line. A certain amount of read-fill is needed to improve performance. However, if read I/O operations are completely random then this results in wasted write cycles and this reduces the life of flash memory.

It would be desirable to implement a more controlled amount of read-fill to improve performance and/or to prevent unnecessary writes to a flash memory.

SUMMARY

The present invention concerns an apparatus comprising a memory and a controller. The memory may be configured to (i) implement a cache and (ii) store meta-data. The cache comprises one or more cache windows. Each of the one or more cache windows comprises a plurality of cache-lines configured to store information. Each of the plurality of cache-lines may be associated with meta-data indicating one or more of a dirty state and an invalid state. The controller may be connected to the memory and configured to detect an input/output (I/O) operation directed to a file system. The controller may perform a read-fill based on a hint value when there is a read miss in the cache. The hint value may be based on the application access pattern. The hint value may be passed to a caching layer with a corresponding I/O.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the invention include providing an enhanced controller used in a solid state drive (SSD) to provide caching using cache-line modulation that may (i) cache a small size I/O, (ii) improve caching device endurance, (iii) retain the use of existing caching models with the addition of a non-intrusive tuning mechanism, (iv) split a cache-line into separately accessible portions, (v) dynamically choose the number of cache-lines (or sub-cache lines) to be read-filled based on the hint value passed, and/or (vi) be implemented as one or more integrated circuits.

The advent of SSDs has enabled a new model of deploying storage based on caching. SSD storage is considerably faster than hard disc drive (HDD) storage (up to 100×). SSD storage devices are in the range of 10-30× more expensive per giga-byte (GB). SSD storage devices tend to have a limited write endurance (e.g., SSD storage devices can only be written a certain number of times before the SSD storage device becomes unusable).

With the above limitations in mind, SSD storage devices are not a straight replacement for HDD storage. Rather, a complementary use of SSD storage together with HDD storage is one of the most common implementations. The SSD storage is often used for caching. For example, some of the most requested (hot) data which needs faster service are stored in the SSD storage devices. Less demanded (cold) data are stored on HDD storage devices. Given the hot/cold nature of the data dynamically changes, a cache logic moves data between SSD storage devices and the HDD storage devices as necessary. The caching logic to move data is often leveraged from pre-existing knowledge and/or designs on how cache devices should be handled. Such designs have long been tested and proven.

However, endurance was not factored in earlier caching designs. For example, the caching logic normally assumed that data could be freely written in every quantity and for as long as needed. Such initial conditions are not accurate for SSD storage devices. As SSD storage devices scale to smaller process technologies, endurance is tending to get even worse. Some initial designs addressed this issue by using SSD devices with a long enough endurance (e.g., SLC and eMLC) and simply ignored the problem.

Market dynamics are pushing SSD storage solutions toward cheaper SSD grades. The life grade of such SSD storage devices is no longer expected to be sufficient to meet both workload and/or life challenges of modern servers implementations.

Figure 1:
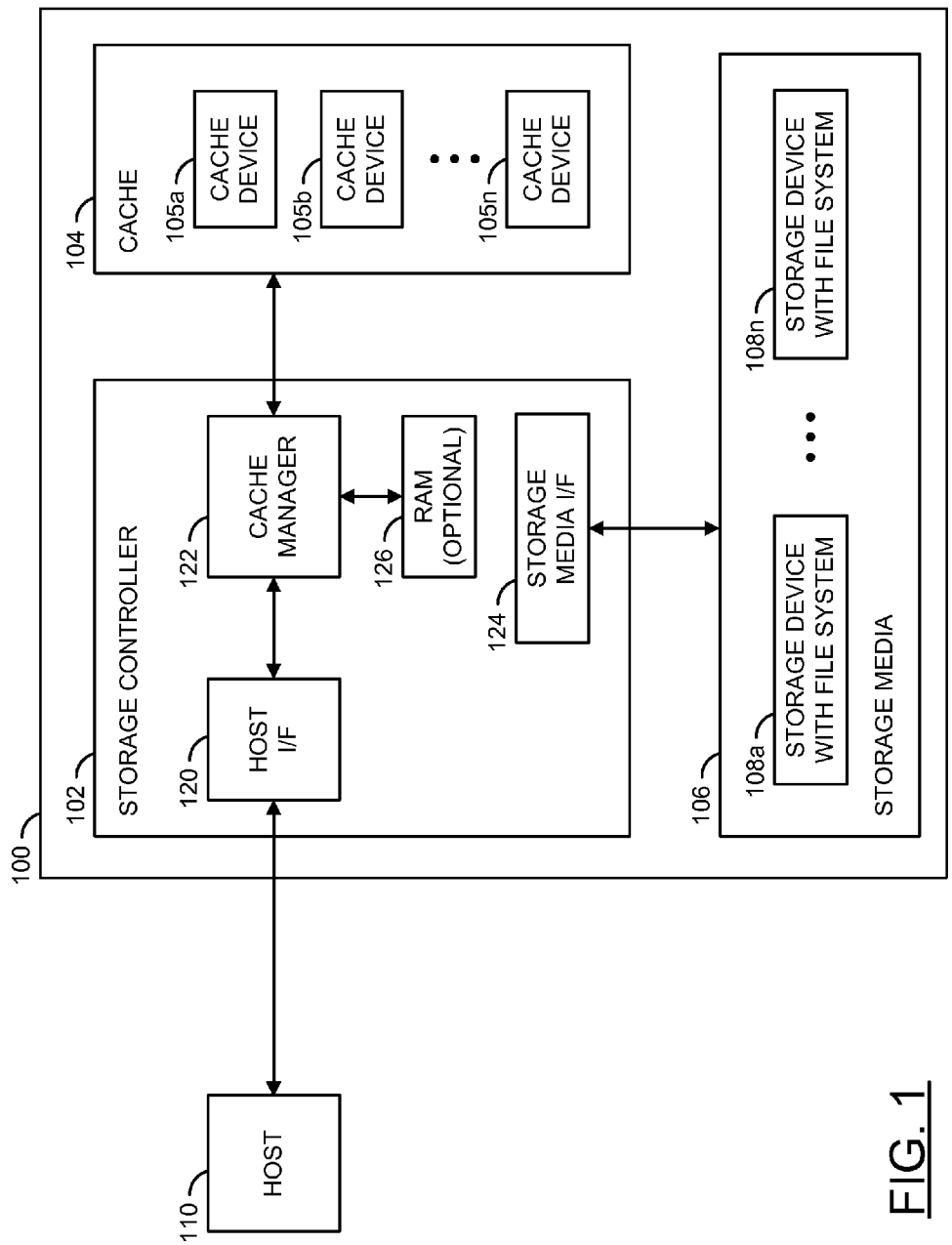
FIG. 1 is a diagram illustrating a storage system in accordance with an example embodiment of the invention.

Referring to FIG. 1, a diagram of a system 100 is shown illustrating an example storage system in accordance with an embodiment of the invention. In various embodiments, the system 100 comprises a block (or circuit) 102, a block (or circuit) 104, and a block (or circuit) 106. The block 102 implements a storage controller. The block 104 implements a cache. In various embodiments, the block 104 may be implemented as one or more cache devices 105a-105n. The one or more cache devices 105a-105n are generally administered as a single cache (e.g., by a cache manager of the storage controller 102). The block 106 implements a storage media (e.g., backend drive, virtual drive, etc.). The block 106 may be implemented using various technologies including, but not limited to magnetic (e.g., HDD) and Flash (e.g., NAND) memory. The block 106 may comprise one or more storage devices 108a-108n. Each of the one or more storage devices 108a-108n may include all or a portion of a file system. In various embodiments, the system 100 may be implemented using a non-volatile storage component, such as a universal serial bus (USB) storage component, a CF (compact flash) storage component, an MMC (MultiMediaCard) storage component, an SD (secure digital) storage component, a Memory Stick storage component, a redundant array of independent disks (RAID) controller storage component, and/or an xD-picture card storage component.

In various embodiments, the system 100 is configured to communicate with a host 110 using one or more communications interfaces and/or protocols. According to various embodiments, one or more communications interfaces and/or protocols may comprise one or more of a serial advanced technology attachment (SATA) interface; a serial attached small computer system interface (serial SCSI or SAS interface), a (peripheral component interconnect express (PCIe) interface; a Fibre Channel interface, an Ethernet Interface (such as 10 Gigabit Ethernet), a non-standard version of any of the preceding interfaces, a custom interface, and/or any other type of interface used to interconnect storage and/or communications and/or computing devices. For example, in some embodiments, the storage controller 102 includes a SATA interface and a PCIe interface. The host 110 generally sends data read/write commands (requests) to the system 100 and receives responses from the system 100 via the one or more communications interfaces and/or protocols. The read/write commands generally include logical block addresses (LBAs) associated with the particular data input/output (I/O). The system 100 generally stores information associated with write commands based upon the included LBAs. The system 100 generally retrieves information associated with the LBAs contained in the read commands and transfers the retrieved information to the host 110.

In various embodiments, the controller circuit 102 comprises a block (or circuit) 120, a block (or circuit) 122, a block (or circuit) 124, and a block (or circuit) 126. The circuit 120 implements a host interface (I/F). The circuit 122 implements a cache manager. The circuit 124 implements a storage medium interface (I/F). The circuit 126 implements an optional random access memory (RAM) that may be configured to store images of cache management information (e.g., meta-data) in order to provide faster access. In some embodiments, the circuit 126 may be omitted. The circuits 104, 122 and 126 (when present) generally implement caching data structures and schemes in accordance with embodiments of the invention.

Figure 2:
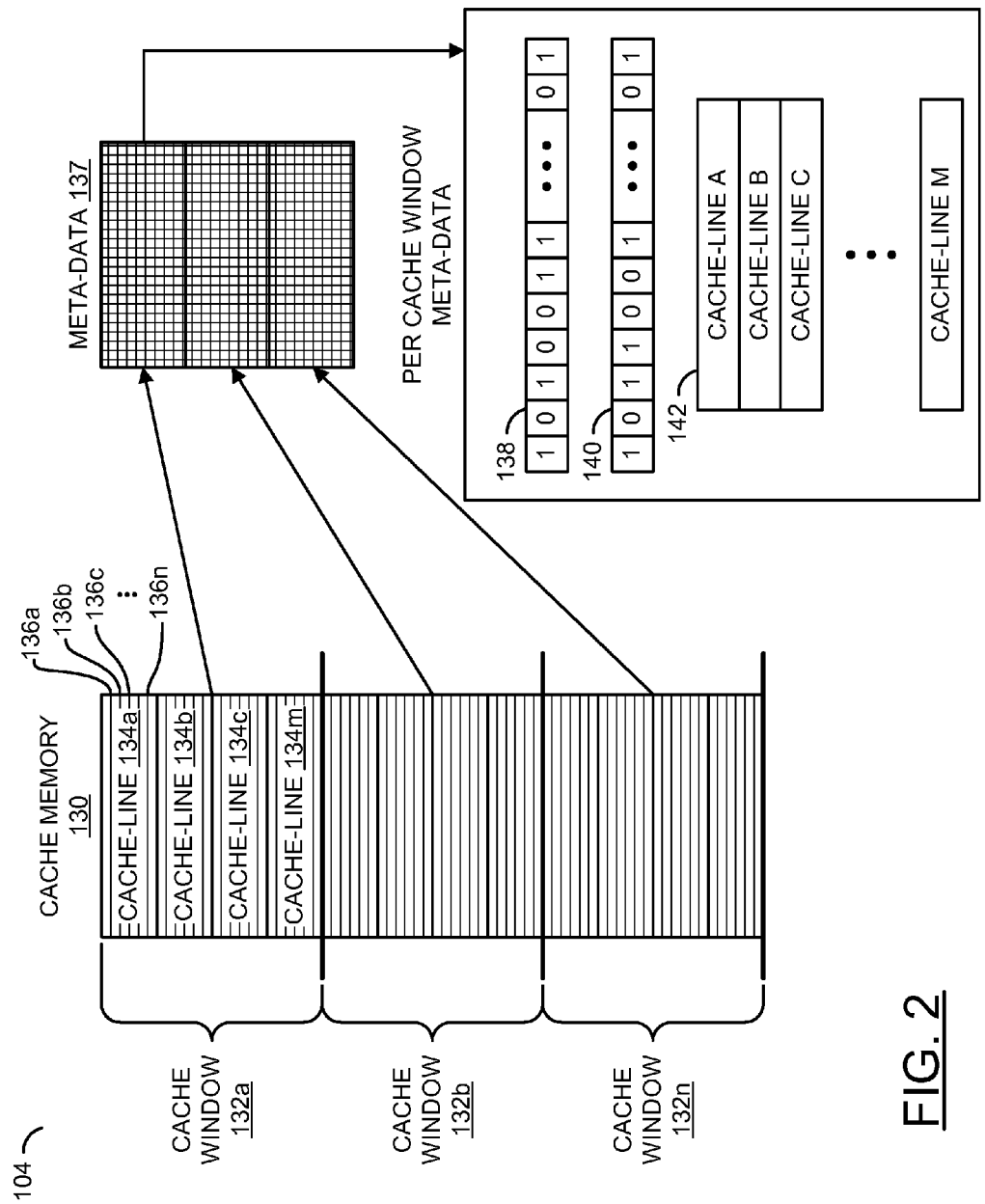
FIG. 2 is a diagram illustrating an example cache memory structure.

Referring to FIG. 2, a diagram is shown illustrating an example cache memory structure implemented in the block 104 of FIG. 1. Caching implementations have a uniform way of handling all cached information. In a write back cache mode, the cache memory 130 of the circuit 104 is split into several cache windows 132a-132n. Each of the cache windows 132a-132n are in turn split into several cache-lines 134a-134m. Each of the cache-lines 134a-134m are in turn split into several sub-cache lines. The cache-line 134a is shown implemented as a number of sub-cache lines 136a-136n. The number of cache windows 132a-132n, the number of cache-lines 134a-134m, and the number of sub-cache lines 136a-136n may each be a variable number that may be the same number or a different number. For example, there may be more (or less) sub-cache lines 136a-136n than the number of cache-lines 134a-134m. The data that is cached is read or written from the storage media 106 in units of cache-line size. Cache data structures (meta-data) 137 are also defined per cache-line. The meta-data 137 keeps track of whether a particular cache-line is resident in the cache memory 130 and whether the particular cache-line 134a-134m is dirty.

In various embodiments, the meta-data 137 comprises a first valid bitmap 138, a second dirty bitmap 140, and cache-line information 142. The first valid bitmap 138 includes a first valid flag or bit associated with sub-cache lines on each cache-line 134a-134m. The second dirty bitmap 140 includes a second dirty flag or bit associated with sub-cache lines on each cache-line 134a-134m. A state of the first flag indicates whether the corresponding sub-cache line is valid or invalid. A state of the second flag indicates whether the corresponding sub-cache line is dirty or clean. In some implementations, the cache-lines within a cache window are not physically contiguous. In that case, the per cache window meta-data 137 stores the information about the cache-lines (e.g. cache-line number) which are part of the cache window in the cache-line information 142. In one example, a size of the cache-line information 142 is four bytes per cache-line. The meta-data 137 is stored persistently on the cache device 104 and, when available, also in the block 106 for faster access. For a very large cache memory, typically the cache-line size is large (>=64 KB) in order to reduce the size of the meta-data 137 on the cache device 104 and in the block 116.

Updates of the meta-data 137 are persisted on the cache device 104. Updating of the meta-data 137 is done at the end of each host I/O that modifies the meta-data 137. Updating of the meta-data 137 is also done during a shutdown process. Whenever a cache window 132a-132n is to be flushed (e.g., either during system recovery following a system reboot, or to free up active cache windows as part of a least recently used replacement or maintaining a minimum number of free cache windows in write back mode), the determination of which cache-lines to flush is based on picking all the valid cache-lines that are marked dirty. Usually, the flush is done by a background task. Once the flush is done successfully, the cache-lines are again indicated as being clean (e.g., the dirty bit for the corresponding cache-lines is cleared).

The circuit 104 is generally compatible with existing caching approaches. For example, the circuit 104 may be used to implement a set of priority queues (in an example implementation, from 1 to 16, where 1 is the lowest priority and 16 is the highest priority), with more frequently accessed data in higher priority queues, and less frequently accessed data in lower priority queues. A cache window promotion, demotion and replacement scheme may be implemented that is based primarily on LRU (Least Recently Used) tracking. The data corresponding to the cache windows 132a-132n is normally read and write intensive. A certain amount of data that is read/written to a cache window within a specified amount of time (or I/Os) makes the cache window "hot". Until such time, a "heat index" needs to be tracked (e.g., via virtual cache windows). Once the heat index for a virtual cache window crosses a configured threshold, the virtual cache window is deemed hot, and a real cache window is allocated, indicating that the data is henceforth cached. While the heat index is being tracked, if sequential I/O occurs, the heat index is not incremented for regular data access. This is because caching sequential I/O access of data is counter-productive. Purely sequential I/O access of data is handled as pass-through I/O issued directly to the storage media 106 since these workloads are issued very rarely. These are usually deemed as one time occurrences. The above are processing steps done for non-journal I/O (read or write).

Once a real cache window is allocated, any I/O (read or write) on a cache-line that is invalid is preceded by a cache read-fill operation. The cache-line is made valid by first reading the data from the corresponding LBAs on the storage medium 106 and writing the same data to the corresponding cache device. Once a cache-line is valid, all writes to the corresponding LBAs are directly written only to the cache device 104 (since the cache is in write back mode), and not written to the storage media 106. Reads on a valid cache-line are fetched from the cache device 104.

The circuit 100 splits the cache-lines 134a-134m into small size sub-cache lines 136a-136n, as shown in FIG. 2. Each bit of valid bitmap (138) and dirty bitmap (140) represents status of one of the sub-cache lines. When a host write I/O size is a multiple of the size of sub-cache lines 136a-136n, no cache read fill is done and the sub-cache lines 136a-136n are directly updated with data from the host 110. Similarly, when a host read I/O size is a multiple of the size of the sub-cache lines 136a-136n, then only the sub-cache lines 136a-136n needed are fetched from the HDD (or backend VD) during a cache miss. As a result, the cache write amplification CWA is significantly reduced as discussed below.

The circuit 100 is most efficient when storage subsystem block size in the host 110 is a multiple of the size of the sub-cache-lines 136a-136n. The procedure to set the storage subsystem block size (e.g., where both the sub-cache line size and the storage block size is 4 Kbyte) is well known. Once a storage subsystem block size is defined, all host I/O size is multiple of the storage subsystem block size.

The cache-lines 134a-134m may be split into the smaller sub-cache lines 136a-136n with each bit of valid bitmap and/or a dirty bitmap representing the state of a sub-cache line. The particular size of the sub-cache lines may be varied to meet the design criteria of a particular implementation. On a 1TB cache device, with a 4 Kbyte sub-cache line, the total size of both valid and dirty bitmap is around 64 Mbyte.

In one example, the sub-cache lines 136a-136n within a cache-line 134a-134m are physically contiguous. As a result, such an implementation allows the cache-lines 134a-134m within one of the cache windows 132a-132n to be noncontiguous and does not allocate additional memory when the cache-lines get split into the sub-cache lines 136a-136n.

With this approach of sub-cache lines, the circuit 100 may ensure that the number of write operations performed on the cache device 104 is limited. In one example, the number of write operations may be as small as possible with very low cache write amplification. The operations of the circuit 100 may result in a longer endurance of the cache device 104.

Figure 3:
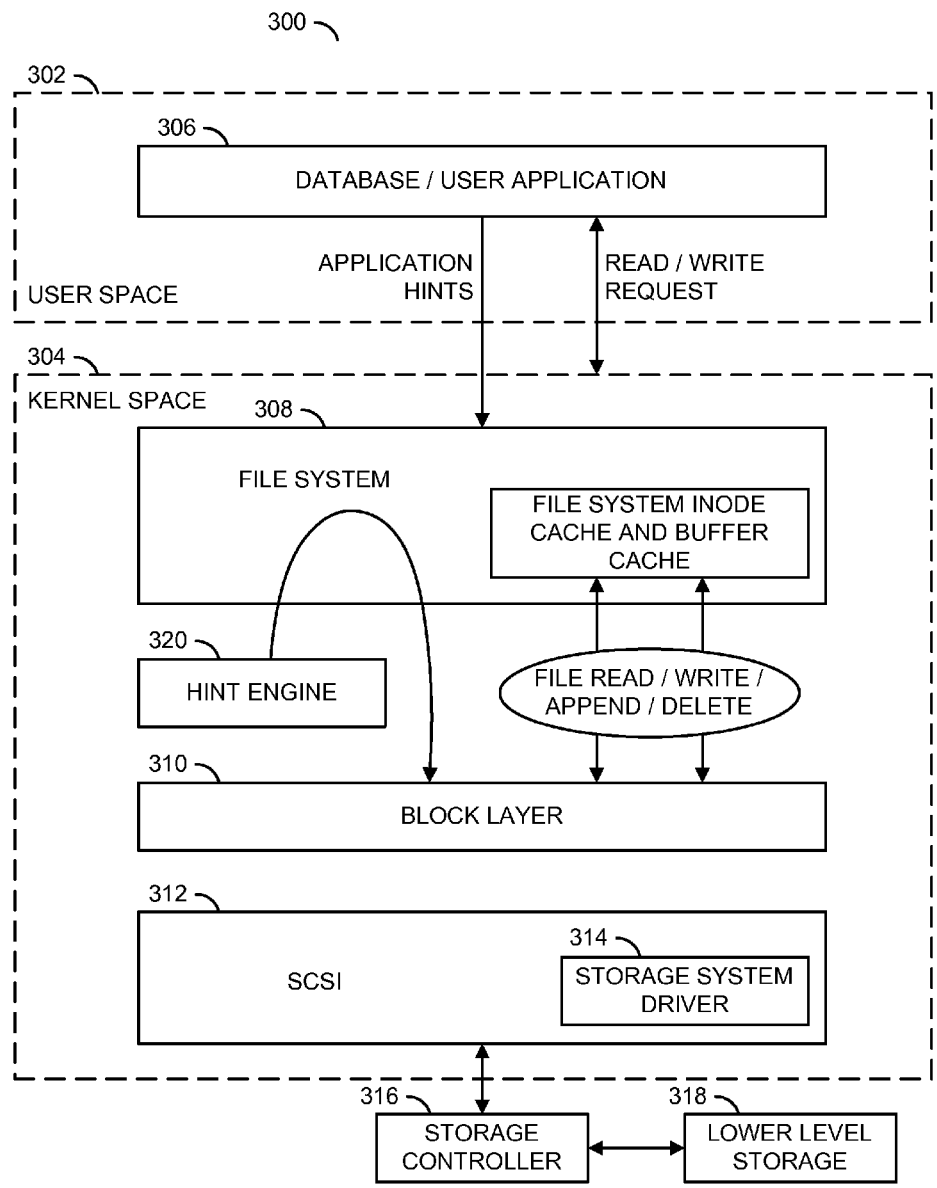
FIG. 3 is a diagram illustrating an example embodiment of a system topology including a hint engine to provide hints to the caching layer.

Referring to FIG. 3, a diagram illustrating an example embodiment of a system topology 300 is shown. The system topology 300 may include a hint engine to provide hints to the caching layer. In various embodiments the system topology 300 may comprise a block (or circuit) 302, a block (or circuit) 304, a block (or circuit) 306, a block (or circuit) 308, a block (or circuit) 310, a block (or circuit) 312, a block (or circuit) 314, a block (or circuit) 316, and a block (or circuit) 318. The circuit 302 may be implemented as a user space 302. The circuit 304 may be implemented as a kernel space 304. The block 306 may be implemented as database/user applications. The block 308 may be implemented as a file system. The circuit 310 may be implemented as a block layer. The circuit 312 may be implemented as a SCSI layer. The circuit 314 may be implemented as a storage system driver. The circuit 316 may be implemented as a storage controller. The circuit 318 may be implemented as lower level storage. The circuit 320 may be implemented as a hint engine. The file system 308 may further include a file system inode (index node) cache and a buffer cache.

The Database/user applications 306 may typically reside in the user space 302. The database/user applications 306 may make I/O requests from the user space 302 to the kernel space 304. The database/user application 306 requests may comprise sequential or non-sequential I/O requests and may include random I/O requests. Different implementations of system topologies may include additional components, hardware, software, or layers residing on the user space 304.

The kernel space 304 may operate below the user space 302. The kernel space 304 may include direct I/O, a system call interface, one or more virtual file systems, one or more file systems 308, the block layer 310, requests containing a plurality of LBAs (logical block addresses), and/or the SCSI layer 312. Different implementations of system topologies may include additional components, hardware, software, or layers residing on the kernel space 304 and, for example, may include the storage controller 316 and the lower level storage 318.

The file system 308 may be configured to organize files or data. The file system 308 may include files and data, wherein the files and data may include or comprise metadata. The file system 308 may send I/O requests to the block layer 310, and the I/O requests of the block layer 310 may include at least one of user data, file system metadata, other data, and/or other metadata. A file system of the file system layer 308, as well as a virtual file system of a virtual file system layer, may contain data (e.g., files) and metadata. The metadata may contain information about same data structures. Files may be associated with inodes (index nodes) or vnodes (virtual index nodes). An inode or a vnode may be identified by an integer number. Inodes or vnodes may store information about files and directories (e.g., folders). For example, inodes or vnodes may contain information about file type, file ownership, and/or access modes (e.g., read, write, permissions, etc.).

The block layer 310 may be configured to receive I/O requests from the file system 308 and direct I/O. Likewise, the file system 308 and the direct I/O may be configured to access the block layer 310. The block layer 310 may be communicatively connected to the SCSI layer 312. The block layer 310 may be configured to send one or a plurality requests to a lower level storage 318 and a storage system controller 316 over the SCSI layer 312.

The SCSI layer 312 may include SAS (serial attached SCSI) connectivity or fibre channel connectivity. The SCSI layer 312 may communicatively connect the block layer 310 to the lower level storage system 318. The SCSI layer 312 may further communicatively connect a plurality of devices, layers, or systems, such as host systems, storage systems, storage controllers, controllers, expanders, storage networks, computer networks, other block layers, etc.

The lower level storage system 318 may comprise one or a plurality of storage devices, such as some combination of hard disk drives (HDDs) or solid state drives (SSDs). The lower level storage system 318 may include the storage controller 316. The lower level storage system 318 may include RAID storage systems and RAID tiered storage systems. The tiered storage system or tiered RAID storage system may further include one or more memories, one or more caches, and one or more processors, as well as software or firmware. The lower level storage system 318 may include an integrated, integratable, connected, or associated storage controller 316. The storage controller 316 may be configured to efficiently handle, transfer, coordinate, and manage storage tasks, such as routing and receiving read/write I/O requests. The storage controller 316 may include software or firmware, comprising code stored in a computer-readable storage medium. The software or firmware of the storage controller may be configured to operate and handle the storage controller tasks. Additionally, a storage system driver or storage controller driver 314 may be configured to interface with the storage controller 316 or the lower level storage system 318. The storage system driver 314 may reside on a device or system connected on the SCSI layer 312. Alternatively, the storage system driver 314 may be located on the storage controller 316. The lower level storage system 318 and storage controller 316 may be configured in a tiered storage system such that hot data is stored in a more quickly accessible storage type such as an SSD and cooler data is stored in a less quickly accessible storage type such as a standard HDD.

The hint engine 320 may be configured to receive, derive, or intercept hints from I/O requests passed from the file system layer 308 to the block layer 310. The I/O requests, which the hint engine may intercept and derive hints from, may include file read, write, append, delete, move, copy, etc. The hint engine 320 may reside in or below the file system layer 308. Additionally, the hint engine 320 may reside in or above the block layer 310. For example, the hint engine 320 may reside between the file system layer 308 and the block layer 310. The hint engine 320 may be configured to check I/O requests for file system contextual information. For example, file system contextual information may comprise at least one of file system metadata, a file system access pattern, a file system inode (index node), a file system vnode (virtual index node), a file system super block, a transaction log of a journaling file system blocks (such as a group descriptor table, a block bitmap, an inode bitmap, or an inode table) that have special significance and influence or reflect the file system layout, or metafiles (such as an inode metafile) that have special significance and influence or reflect the file system layout.

Database/user applications 306 of the system topology 300 may pass application hints with read/write requests. For example, applications may pass application hints during, before, or after sending read/write requests from the user space 302 to layers (e.g., the file system layer 308, a virtual file system layer, a system call interface, or the block layer 310) of the kernel space 304. An application hint may be passed as part of a read/write request or may comprise one or more separate signals, transmissions, notifications, or messages sent before or after the read/write request.

Hinting allows certain host or application specific information to be passed to a lower level, such as the lower level storage tier 318. Hinting allows information that would not otherwise be available to the lower level to be used for more efficient caching. For example, hinting information may be utilized for improved caching or auto-tiering. Hinting may enable weighted averages (weight-ages) of various metadata information to be passed down to the lower level. Hinting may further include passing a data access pattern of the file system or application down to the lower level. The lower level may then act or respond more efficiently or appropriately based upon characteristics of data obtained through hinting. For example, hints may be provided as an advisor or director for a lower level storage controller 316, storage system driver 314, system, or associated software or firmware.

Hinting may comprise file system specific hinting and/or application specific hinting. File system hinting may be derived without dependency on other applications. Application specific hinting may include support from one or more respective applications. The hinting solution may also expose APIs which may override the default application hinting process/mechanism, and these APIs will enable applications to provide more specific hints and have better control over the hints. Additionally, a set of generic APIs may be made available such that applications may use the APIs to pass hints to lower levels.

The hint engine 320 may be configured to generate file system hints. The hint engine 320 may be configured to obtain information from a file system 308 by snooping, intercepting, or receiving read/write requests sent from the file system 308. The hint engine 320 may then generate or derive file system hints from the information obtained from the file system 308. The hint engine 320 may be configured to generate application driven hints. The hint engine 320 may generate application driven hints by exposing APIs (application program interlaces) or determining the I/O controls that applications are using to communicate.

The hint engine 320 may include a communication component configured to send or pass at least one of the file system hints or the application driven hints down to the lower level storage system 318. The communication component may be configured to send only or primarily send file system and/or application driven hints down to the storage controller 316. Alternatively, the communication component may be configured to send hints as part of or contained within normal requests (e.g., read/write I/O requests). In another embodiment, the communication component may be configured to send or pass hints to the storage controller 316 and to send or relay standard read/write requests. For example, the communication component may be configured to send or pass the hints before, during, after, or within read/write requests. By further example, in some implementations one or more hints may be attached, inserted, injected, or placed into unused fields of blocks of an I/O request; thereby, the one or more hints may be passed down or sent down to the storage controller 316 as part of the I/O request.

In some implementations, when an I/O request does not have any unused fields or does not have unused fields with adequate size or capacity, a hint may be passed down in a later message to the storage controller 316, or the hint may be passed down in an unused field of a subsequent I/O request. When the hint is passed down as a subsequent message or when placed within an unused field of a subsequent I/O request, the hint may include or be accompanied by an associated offset indicator, the offset indicator indicating at least one of the real I/O request that the hint pertains to, or the amount of time or number of I/O requests which offset the hint from the real I/O request to which the hint pertains. The lower level storage system 318 or the storage controller 316 may then reassemble, reunite, or re-associate the separated subsequent hint to the proper I/O request as the storage controller 316 or the lower level storage system 318 receives the I/O request and the associated hint(s) or parts of hints.

Hint processing may be carried out by hardware, firmware, or software at the storage level by a hint processing component or module, such as by or at the storage driver 314, the storage controller 316, the lower level storage system 318, or the like. In one embodiment, the hint processing may be performed by firmware on the storage controller 316. In another embodiment, the hint may be pre-configured for a given file system volume. A pre-configured hint may be fixed for a given file system volume. The hint may be pre-configured in any layer processing the hint (e.g., the storage system driver 314, the storage controller 316, and/or the lower level storage system 318). Pre-configuration may be done in the firmware, in the software, through an external signal, and/or through any mechanism available to configure a file system volume.

Figure 4:
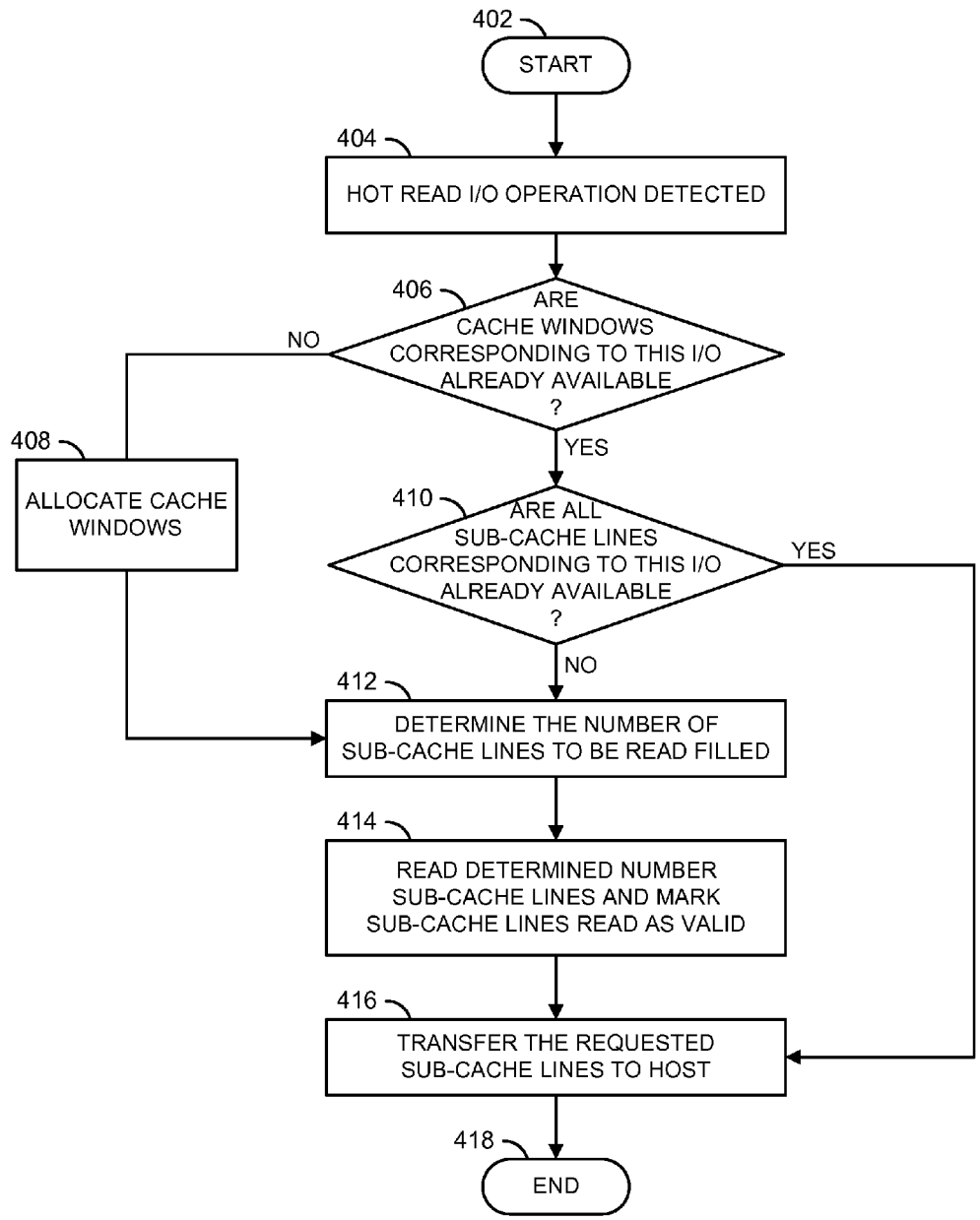
FIG. 4 is a flow diagram of a process to handle I/O requests, hint values, and dynamically choose the number of sub-cache lines to be read-filled based on the hint value passed.

Referring to FIG. 4, a diagram of a method (or process) 400 is shown. The method 400 may handle I/O requests, hint values, and/or may dynamically choose the number of sub-cache lines to be read-filled based on the hint values passed. The method 400 generally comprises a step (or state) 402, a step (or state) 404, a decision step (or state) 406, a step (or state) 408, a decision step (or state) 410, a step (or state) 412, a step (or state) 414 a step (or state) 416, and a step (or state) 418. The step 402 may start the method 400. The step 404 may detect a hot read I/O operation. The decision state 406 may determine whether there are cache windows corresponding to this I/O operation already available. If not, the method 400 moves to state 408. The state 408 allocates cache windows and the method 400 moves to state 412. In the decision state 406, if the method 400 determines there are cache windows corresponding to this I/O operation already available the method 400 moves to the state 410. The decision state 410 may determine whether all sub-cache lines corresponding to this I/O operation are already available. If so, the method 400 moves to the state 416. If not, the method 400 moves to the state 412. The state 412 may determine the number of sub-cache lines to be read filled corresponding to the I/O read operation. The value of $N_1$ may represent the beginning of the sub-cache line requested corresponding to the read I/O operation. The value $N_2$ may represent the end of the sub-cache line requested corresponding to the read I/O operation. The value S may represent the number of sub-cache lines in a cache-line. The value $H_{READ\text{-}BEHIND}$ may represent the hint for the number of sub-cache lines to read-behind. The value $H_{READ\text{-}AHEAD}$ may represent the hint for the number of sub-cache lines to read-ahead. The hints may come together with the I/O operation, or may be pre-configured for a given file system volume. The determined sub-cache lines to be read filled may be starting from $N_3$ read $N_4$ cache-lines. The value $N_3$ may be determined by the formulas:

$$N_3 = N_1 - H_{READ\text{-}BEHIND}, \text{ if } (N_1 - (N_1/S) \times S) > H_{READ\text{-}BEHIND}$$

representing a situation when $N_1 - H_{READ\text{-}BEHIND}$ does not cross the cache-line boundary, and $$N_3 = (N_1/S) \times S$$

representing a situation when $N_1 - H_{READ\text{-}BEHIND}$ crosses the cache-line boundary. The value $N_4$ may be determined by the formulas:

$$N_4 = N_2 + H_{READ\text{-}AHEAD}, \text{ if } (S - (N_2 - (N_2/S) \times S)) > H_{READ\text{-}AHEAD}$$

representing a situation when $N_2 + H_{READ\text{-}AHEAD}$ does not cross the cache-line boundary, and $$N_4 = ((N_2 + H_{READ\text{-}AHEAD})/S) \times S$$

representing a situation when $N_2 + H_{READ\text{-}AHEAD}$ crosses the cache-line boundary. Next, the method 400 moves to the state 414. The state 414 reads the determined sub-cache lines and marks the determined sub-cache lines read as valid. Next, the method 400 moves to the state 416. The state 416 transfers the requested sub-cache lines to the host. Next, the state 418 may end the method 400.

Generally, reads are brought into cache not because a piece of data is needed at that very moment (in such a case the data may simply be read from the HDD and forwarded to a system without any cache), but because code and data have locality. For example, if data x is read, it is common that data x+1 will be read soon after. Bringing in the entire cache-line may allow subsequent reads to be served from the cache.

Current cache logics bring in an entire 64 KB stripe. Generally, locality does not span an entire 64 KB stripe. A sub-cache line block size may be defined as a contiguous set of the sub-cache lines 136a-136n. A sub-cache line block size may be tuned, based on experience, to best fit the read-fill value for a particular application. The amount of read-fill may vary per I/O operation. A read-fill hint may provide information used to determine read-ahead and/or read-behind. A hint may be received from an application running on the host 110. In another embodiment, the amount of read-fill may be fixed for all I/O operations for a file system volume and the hint may come from a pre-configured hint engine. For example, if the optimal read-ahead is determined to be 16 KB (rather than 64 KB), a sub-cache line block size may be defined as 16 KB (4 contiguous 4 KB blocks). If all the data is served out of one of the sub-cache lines 136a-136n, the next one may be brought in, and so on. The impact on endurance of the cache memory 130 may be that cache logic schemes without the controller 102 retrieve a large, and likely excessive, 64 KB block sizes and write 64 KB block sizes in the cache memory 130. The controller 102 may retrieve an optimized 16 KB block size. The controller 102 may statistically reduce write amplification by a factor of 4. If a read operation is needed from the middle of a cache-line then the cache logic for reads may be the following:

| Action (read I/O operations): | Implemented as: |
|---|---|
| Line Fill | Fill only sub-cache line block |
| Read | Read data |
| Line eviction (clean data) | Discard line |
| Line eviction (dirty data) | Write back all dirty data in sub-cache line block to HDD |

Real life applications may be somewhat different and/or may be determined case by case. However, the above logic does not need to be static. For example, the above logic may be dynamic and/or flexible.

The hint engine 320 may be leveraged to extend the value of the above logic. The hint engine 320 provides a mechanism for a file system, or any application, to provide hints on the likelihood some data would be reused. The hints may be based on the nature of the application, and/or based on the nature of a segment of data.

One way to extend hinting logic to benefit caching may be to recognize that all the fixed parameters above, and particularly the size of the sub-cache line block, may be application dependent and/or local data dependent. For example, some structures may be small in nature and others may be very large. The hint engine 320 may be modified to pass a tag with the appropriate size of the sub-cache line blocks to read-ahead and/or read-behind for each I/O operation. For example, if an application is reading n sub-cache lines from a block and hints $H_{READ\text{-}AHEAD}$ and/or $H_{READ\text{-}BEHIND}$ are passed, then a read of $n + H_{READ\text{-}AHEAD} + H_{READ\text{-}BEHIND}$ sub-cache lines should be performed.

The number of sub-cache lines to be read within a cache-line may never cross the total number of sub-cache lines within a cache-line. For example, in the case of a 64 KB cache-line and a 4 KB sub-cache line there are 16 sub-cache lines within the cache-line. If the application on the host 110 requests to read 10 sub-cache lines from a block aligned to the cache-line boundary with a read-ahead of 10 sub-cache lines a read of 20 (10+10) sub-cache lines would not need to be performed. Only 16 sub-cache lines would be read corresponding to the 16 sub-cache lines in the cache-line. The number of read operations does not generally exceed the amount of read operations performed in a system without sub-cache lines and a hint.

In another example, if an I/O size is 4 KB, and is expected to be unrelated to neighboring data, the hint may be that the both the $H_{READ\text{-}AHEAD}$ and the $H_{READ\text{-}BEHIND}$ are equal to zero. A read-ahead and read-behind of zero may create a further endurance improvement of 16× of the cache memory 130 (as opposed to the 16 KB sub-cache line block definition above).

In another example, the hinting and/or read-fill logic may be applied to a system that does not use sub-cache lines. For example, the cache windows 132a-132n may be split into the cache-lines 134a-134m. However, the cache-lines 134a-134m may not need to be split into the sub-cache lines 136a-136n. In such an example, the hinting and/or read-fill logic described may be applied to a number of the cache-lines 134a-134m. The hint may provide the number of cache-lines 134a-134m that need to be read-filled in addition to the cache-lines requested by the I/O operation. The method to determine a read-fill operation for cache-lines may be similar to the method 400 (described in FIG. 4 above) but with units of cache-lines instead of sub-cache lines.

A side effect of the system 100 may be that by writing less data, performance will also be faster than writing more data. Aside from endurance improvements, there may be an expected improvement in performance as the amount of data being moved per I/O is smaller.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The functions performed by the diagram of FIG. 4 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to embodiments thereof, it will be understood by those skilled in the art that various changes in form and details may be made without departing from the scope of the invention.

The invention claimed is:

1. An apparatus comprising:
a memory configured to (i) implement a cache and (ii) store meta-data, said cache comprising one or more cache windows, each of said one or more cache windows comprising a plurality of cache-lines configured to store information, wherein each of said plurality of cache-lines is associated with meta-data indicating one or more of a dirty state and an invalid state; and
a controller connected to said memory and configured to detect an input/output (I/O) operation directed to a file system and perform a read-fill based on a hint value when there is a read miss in said cache, wherein said hint value is (i) determined based on the application access pattern and (ii) passed to a caching layer within an unused field of a corresponding I/O request.

2. The apparatus according to claim 1, wherein said hint value is pre-configured for a given file system volume.

3. The apparatus according to claim 1, wherein said hint value includes a read-ahead hint value and a read-behind hint value.

4. The apparatus according to claim 1, wherein each of said cache-lines comprises a plurality of sub-cache lines, wherein each of said plurality of sub-cache lines is associated with metadata indicating one or more of a dirty state and an invalid state.

5. The apparatus according to claim 4, wherein said controller is configured to (i) recognize sub-cache line boundaries, (ii) perform processing of I/O requests in multiples of a size of said sub-cache lines to minimize cache-fills, and (iii) dynamically choose a number of sub-cache lines to read-fill based on the hint value passed.

6. The apparatus according to claim 1, wherein said apparatus improves the endurance of said memory.

7. The apparatus according to claim 1, wherein said hint value is processed by at least one of a storage driver, a storage controller, and a storage system.

8. The apparatus according to claim 1, wherein said hint value is determined using a hint engine.

9. The apparatus according to claim 8, wherein said hint engine is configured to allow information that would not otherwise be available to a lower level storage to be used for efficient caching.

10. The apparatus according to claim 9, wherein said hint engine is configured to expose APIs to enable applications to provide specific hints.

11. The apparatus according to claim 1, wherein said hint value determines the number of sub-cache lines to be read filled.

12. The apparatus according to claim 1, wherein said read-fill prevents wasted write cycles and wherein said hint value includes an offset indicator that indicates at least one real I/O request to which the hint value pertains.

13. The apparatus according to claim 1, wherein said apparatus is implemented in a RAID configuration.

14. The apparatus according to claim 1, wherein said apparatus is implemented as one or more integrated circuits.

15. A method for caching data in a solid state drive, comprising the steps of:
configuring a memory to (i) implement a cache and (ii) store meta-data, said cache comprising one or more cache windows, each of said one or more cache windows comprising a plurality of cache-lines configured to store information, wherein each of said plurality of cache-lines is associated with meta-data indicating one or more of a dirty state and an invalid state; and
connecting a controller to said memory, said controller to detect an input/output (I/O) operation directed to a file system and perform a read-fill based on a hint value when there is a read miss in said cache, wherein said hint value is (i) determined based on the application access pattern and (ii) passed to a caching layer within an unused field of a corresponding I/O request.

16. The method of claim 15, wherein each of said cache-lines comprises a plurality of sub-cache lines, wherein each of said plurality of sub-cache lines is associated with metadata indicating one or more of a dirty state and an invalid state, and wherein said controller is configured to (i) recognize sub-cache line boundaries, (ii) perform processing of I/O requests in multiples of a size of said sub-cache lines to minimize cache-fills, and (iii) dynamically choose a number of sub-cache lines to read-fill based on the hint value passed.

17. The method of claim 15, wherein said hint value is determined using a hint engine and wherein said hint engine is configured to allow information that would not otherwise be available to a lower level storage to be used for efficient caching.

18. The method of claim 17, further comprising:
enabling said hint engine to expose one or more Application Programming Interfaces (APIs) to enable applications to provide specific hints on a likelihood that data will be reused.

19. An apparatus comprising:
a memory configured to (i) implement a cache and (ii) store meta-data, said cache comprising one or more cache windows, each of said one or more cache windows comprising a plurality of cache-lines configured to store information, wherein each of said plurality of cache-lines is associated with meta-data indicating one or more of a dirty state and an invalid state; and
a controller connected to said memory and configured to detect an input/output (I/O) operation directed to a file system and perform a read-fill based on a hint value when there is a read miss in said cache, wherein said hint value is (i) determined based on the application access pattern and (ii) passed to a caching layer with a corresponding I/O, wherein each of said cache-lines comprises a plurality of sub-cache lines, wherein each of said plurality of sub-cache lines is associated with metadata indicating one or more of a dirty state and an invalid state, and wherein said controller is configured to (i) recognize sub-cache line boundaries, (ii) perform processing of I/O requests in multiples of a size of said sub-cache lines to minimize cache-fills, and (iii) dynamically choose a number of sub-cache lines to read-fill based on the hint value passed.

20. The apparatus of claim 19, wherein said hint value is determined using a hint engine and wherein said hint engine is configured to allow information that would not otherwise be available to a lower level storage to be used for efficient caching.

* * * * *